(12) United States Patent
Bauer et al.

(10) Patent No.: US 11,787,269 B2
(45) Date of Patent: Oct. 17, 2023

(54) SMART MULTI-MODAL VEHICULAR AIR FILTERING SYSTEM AND ASSOCIATED METHODS

(71) Applicant: MANN+HUMMEL GmbH, Ludwigsburg (DE)

(72) Inventors: Bernd Bauer, Stadelhofen (DE); Thomas Heininger, Niederaichbach (DE); Dominik Haider, Gottfrieding (DE); Tobias Schwimmbeck, Dingolfing (DE); Mathias Hoesl, Marklkofen (DE); Matthias Heinzmann, Weinheim (DE); Andreas Weber, Freiberg (DE); Mirco Schoen, Schauenstein (DE); Mario Schoen, Gefrees (DE); Martin Klein, Bayreuth (DE); Pascal Thau, Stuttgart (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 18/186,232

(22) Filed: Mar. 20, 2023

(65) Prior Publication Data
US 2023/0294489 A1 Sep. 21, 2023

Related U.S. Application Data

(62) Division of application No. 15/615,791, filed on Jun. 6, 2017, now Pat. No. 11,642,942.

(51) Int. Cl.
*B60H 3/06* (2006.01)
*B01D 53/04* (2006.01)
(Continued)

(52) U.S. Cl.
CPC .......... *B60H 3/0625* (2013.01); *B01D 53/04* (2013.01); *B01D 53/0407* (2013.01);
(Continued)

(58) Field of Classification Search
CPC ............... B01D 53/04; B01D 53/0407; B01D 46/0036; B01D 46/442; B01D 46/56; B01D 2253/102; B01D 2253/108; B01D 2257/106; B01D 2257/302; B01D 2257/404; B01D 2257/406; B01D 2257/502; B01D 2257/702; B01D 2257/7022; B01D 2257/708; B01D 2257/90; B01D 2258/06; B01D 2259/40001; B01D 2259/4566; B01D 2273/16; B01D 2279/40; B60H 3/0625;
(Continued)

(56) References Cited

FOREIGN PATENT DOCUMENTS

KR 20170007003 A 1/2017

*Primary Examiner* — Christopher P Jones
*Assistant Examiner* — Phillip Y Shao

(57) ABSTRACT

A smart multi-modal vehicular air filtration management system including a first filter element and a second filter element disposed in a fresh air housing, wherein the fresh air housing has an inlet and an outlet. Additionally, a third filter element is provided which is disposed in a cabin housing, the cabin housing having one or more inlet. A fluid channel arranged between the fresh air and cabin housing. Finally, a diverter is included which is disposed near an outlet of the fresh air housing, wherein the diverter is configured to cause air to flow through the fresh air housing selectively through one or both of the first filter element and the second filter element.

8 Claims, 8 Drawing Sheets

(51) Int. Cl.
   B60H 3/02  (2006.01)
   B60H 1/00  (2006.01)
   B01D 46/44  (2006.01)
   B01D 46/00  (2022.01)
   B01D 46/56  (2022.01)

(52) U.S. Cl.
   CPC ......... *B60H 1/008* (2013.01); *B60H 1/00771* (2013.01); *B60H 1/00849* (2013.01); *B60H 3/024* (2013.01); *B60H 3/0641* (2013.01); *B01D 46/0036* (2013.01); *B01D 46/442* (2013.01); *B01D 46/56* (2022.01); *B01D 2253/102* (2013.01); *B01D 2253/108* (2013.01); *B01D 2257/106* (2013.01); *B01D 2257/302* (2013.01); *B01D 2257/404* (2013.01); *B01D 2257/406* (2013.01); *B01D 2257/502* (2013.01); *B01D 2257/702* (2013.01); *B01D 2257/708* (2013.01); *B01D 2257/7022* (2013.01); *B01D 2257/90* (2013.01); *B01D 2258/06* (2013.01); *B01D 2259/40001* (2013.01); *B01D 2259/4566* (2013.01); *B01D 2273/16* (2013.01); *B01D 2279/40* (2013.01); *B60H 1/00742* (2013.01); *B60H 1/00864* (2013.01); *B60H 2001/00085* (2013.01); *B60H 2003/0683* (2013.01); *B60H 2003/0691* (2013.01)

(58) Field of Classification Search
   CPC   B60H 1/00771; B60H 1/008; B60H 1/00849; B60H 3/024; B60H 3/0641; B60H 1/00742; B60H 1/00864; B60H 2001/00085; B60H 2003/0683; B60H 2003/0691
   See application file for complete search history.

| Driving Situation | Outdoor air sensor 616 | Cabin air sensor 620 | Water separator 50 | Second filter element 300 | First filter element 400 | Cabin filter gas adsorption (with 500) |
|---|---|---|---|---|---|---|
| 1. Fresh, good air (Yosemite Mode) | x | | | | | |
| 2. Moderate particles & harmful gas level detected | x | x | | | | |
| 3. Traffic jam/slow traffic | x | x | x | x | | |
| 4. Tunnel | x | x | x | | | |
| 5. High particle, harmful gas levels detected | x | x | x | x | x | x |
| 6. Desorption/parking | | | | | | x |

FIG. 10

SMART MULTI-MODAL VEHICULAR AIR FILTERING SYSTEM AND ASSOCIATED METHODS

CROSS-REFERENCE TO RELATED APPLICATION

This application is a divisional application of U.S. application Ser. No. 15/615,791 filed on Jun. 6, 2017, the entire disclosure of which is incorporated herein by reference for all purposes.

BACKGROUND

The present disclosure generally relates to the field of air filtration, primarily filtration of cabin air for passenger vehicles or commercial vehicles.

It has been recognized that in order to maintain passenger comfort in the cabin of a vehicle that a sufficient supply of air must be provided to the cabin. In part because the passengers consume oxygen and exhale carbon dioxide wherein the oxygen needs to be replenished but also to maintain other properties that increase comfort, such as air circulation for maintaining temperatures, as well as expelling or removing noxious gasses, particulates, or even body odors from the air.

Typical cabin air filtration mechanisms often have the ability to selectively draw air from an ambient environment surrounding the vehicle, or to recirculate air from within the cabin. In order to improve air quality filter elements are often provided within the air conduits so as to filter the various streams of air provided to the cabin. Pre-existing systems have historically required mandatory filtration through various filter elements wherein mandatory filtration through a number of filter elements increases the flow resistance and correspondingly increases the load on the blower fan, and energy consumption thereof, while not allowing for tailoring of the cabin air based on varying environmental factors from which the vehicle may be drawing the air as supplied. Also, typically, the filter element is generally part of the HVAC system of the vehicle.

SUMMARY

Contemplated herein is a filter management system comprising a first filter element and a second filter element disposed in a fresh air housing, wherein the fresh air housing has an inlet and an outlet. There is a third filter element disposed in a cabin housing, wherein the cabin housing has at least one inlet and a fluid channel arranged between the fresh air and cabin housing. A first diverter disposed proximal an outlet of the fresh air housing or an interior of the fresh air housing, and allows ambient air to flow through the fresh air housing in a plurality of flow paths.

The first diverter can be controlled via electro-mechanical means or via pneumatic means.

The filter management system can further include a control unit that comprises a processor in communication with the first diverter and at least one sensor. The sensor(s) can be configured to detect a quality of ambient air entering the filter management system such as, but not limited to, particle size concentration, composition and concentrations of gas, temperature, pressure, air flow speed, optical features, vehicle operation status, charging status, vehicle occupancy, or humidity in the ambient air and so forth.

In another arrangement, the cabin housing can further include a filter diverter associated with the fluid channel and air directed from the fresh air housing. It can also have a bypass diverter associated with a direct fresh air inlet of the cabin housing, and a cabin diverter associated with a recirculation inlet of the cabin housing, wherein the filter, bypass and cabin diverters can be positioned in an open position, a closed position, or a partially open position.

In another arrangement, the filter management system can include a GPS unit and database unit in communication with a processor.

In another arrangement, the filter management system includes an intake system having a moisture management system, wherein the intake system is in fluid communication with the inlet of the fresh air housing, and wherein the moisture management system is configured to remove moisture from the air entering the intake system and prior to passing into the fresh air housing.

The filter management system can include a fan disposed proximal a clean air side of the third filter element.

In an arrangement of the filter management system a processor is in communication with each of the diverters, sensors configured to detect a quality of ambient air entering the filter management system, a GPS unit, and a database. In this manner, each of the diverters can affect an air flow path through the system as directed from the processor based on information received by the processor from the sensor(s), the GPS unit, or the database.

In another arrangement, the sensor(s) are placed inside the cabin of the vehicle to detect internal air conditions, while external sensors can be placed outside the vehicle to detect external ambient air conditions.

In another arrangement data received by a GPS unit and the sensor(s) can be received by the processor and directed to be stored in an onboard database or external remote database.

In an arrangement, the fresh air housing comprises separate openings for separately removing the first filter element and the second filter element.

In another embodiment a method of managing the filtration of a vehicle, comprising the steps of: detecting at least one parameter of ambient air from outside of a vehicle; detecting at least one parameter of cabin air from inside of the vehicle; modifying an air flow path through a filter management system using a plurality of diverters, wherein the filter management system comprises: a first filter element and a second filter element disposed in a fresh air housing, wherein the fresh air housing has an inlet, an outlet and a first diverter, a third filter element disposed in a cabin housing, wherein the cabin housing has a filtered inlet and filtered diverter, a fresh air inlet and bypass diverter, and a recirculation air inlet and cabin diverter, and a fluid channel arranged between the fresh air and cabin housing;

In the above method embodiment, the air flow path is directed in one of the following manners: ambient air flows into the fresh air housing through the first element and the second filter element and then into cabin housing through the third filter element; ambient air flows into the fresh air housing through the first filter element and then into cabin housing through the third filter element; ambient air flows into the cabin through the fresh air inlet and through the third filter element; or ambient air flows into the cabin housing from the recirculating air inlet and through the third filter element.

The method above can further comprise a step of detecting a number of occupants inside a vehicle and modifying the speed of the air flow path based on the number of detected occupants.

The method above can alternatively comprise a step of modifying the air flow path based on recording the sensed data along with location information received from a GPS unit into a database.

The method above can further comprise a step of determining a charging status of a vehicle or an idle status of the vehicle, and based on that determined status revert the air flow path to be directed from a clean side of the third filter element through the third filter element and out through the fresh air inlet.

Another method embodiment of managing the filtration of a vehicle, comprises the steps of: determining a location of the vehicle; accessing a database having air quality information associated with the determined location; and modifying an air flow path through a filter management system using a plurality of diverters, wherein the filter management system comprises: a first filter element and a second filter element disposed in a fresh air housing, wherein the fresh air housing has an inlet, an outlet and a first diverter, a third filter element disposed in a cabin housing, wherein the cabin housing has a filtered inlet and filtered diverter, a fresh air inlet and bypass diverter, and a recirculation air inlet and cabin diverter, and a fluid channel arranged between the fresh air and cabin housing.

The method embodiment directly above can cause the air flow path to be directed in one of the following manners: air flows into the fresh air housing through the first filter element and the second filter element and then into cabin housing through the third filter element; air flows into the fresh air housing through the first filter element and then into cabin housing through the third filter element; air flows into the cabin through the fresh air inlet and through the third filter element; or air flows into the cabin housing from the recirculating air inlet and through the third filter element.

The embodiment method above using location information can further comprise the step of detecting a number of occupants inside a vehicle and modifying the speed of the air flow path based on the detected number occupants.

The embodiment method above using location information can further comprise the step of determining a charging status of a vehicle and based on that charging status revert the air flow path to be directed from clean side of the third filter element through the third filter element and out through the fresh air inlet.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such claims.

These aspects of the invention are not meant to be exclusive and other features, aspects, and advantages of the present invention will be readily apparent to those of ordinary skill in the art when read in conjunction with the following description, appended claims, and accompanying drawings. Further, it will be appreciated that any of the various features, structures, steps, or other aspects discussed herein are for purposes of illustration only, any of which can be applied in any combination with any such features as discussed in alternative embodiments, as appropriate.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention, wherein:

FIG. 10 provides a table supporting a discussion of one possible exemplary functional description of a computer controlled operation of an embodiment of the smart multi-modal vehicular air filtering system according to FIG. 8 and the description below.

DETAILED DESCRIPTION

Figure 1:
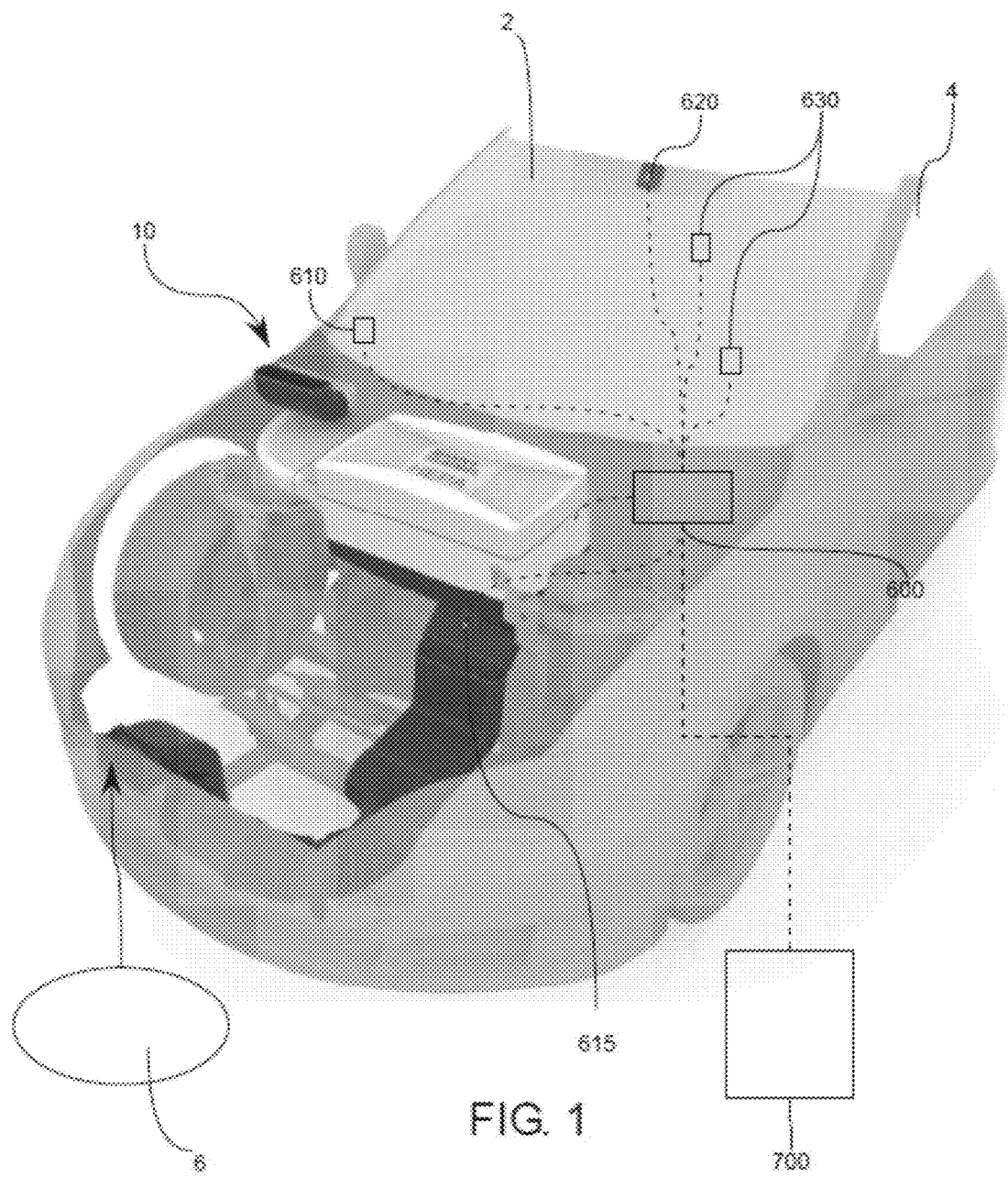
FIG. 1 illustrates a perspective view of an exemplary vehicle being provided with a smart multi-modal vehicular air filtering system being illustrative of various aspects of the present invention.

Contemplated herein is a smart multi-modal vehicular air filtration management system 10 as illustrated in FIGS. 1-6, and 8. The smart multi-modal vehicular air filtration management system 10 is configured to be provided to a vehicle 2 so as to supply fresh filtered air from an ambient environment 6 into a cabin portion 4, or to recirculate a portion of the air within the cabin portion 4, or a combination thereof.

The smart multi-modal vehicular air filtration management system 10 can include a control unit 600 which can receive data from one or more sensors 610, 612, 614, 615, 616, 620, or 630, as will be discussed in more detail below. Based on one or more sensed data parameters the behavior of the smart multi-modal vehicular air filtration management system 10 can be altered so as to optimize the cabin air and thus increase the comfort of passengers in the cabin.

In order to reduce energy consumption and reduce the load on the fan 652 of smart multi-modal vehicular air filtration management system 10, the smart multi-modal vehicular air filtration management system 10 can be configured to use a variety of air intake modes and fluid pathways based on sensed data so as to achieve a desired air quality in the cabin using the least amount of resistance, i.e. only utilizing necessary filter element when a sensed condition is determined. Additionally, by providing alternative flow paths and not using unnecessary filter element when not needed, these filter element will also be provided with an increased service life, as they will not all have a constant pressure associated with air moving across them and the associated wear in all instances.

A filter element is an element comprising a filter medium disposed in a frame. The filter medium may comprise one or more layers of various filtration media that act to remove particulates or gases from the air. The filter medium may be a flat or pleated medium. Examples of the suitable media include paper, cotton, organic fibers, non-organic fibers, foam, spun-bond material, melt-blown material, glass fibers, or metal or plastic mesh. Also, the media may include a layer that adsorbs gases or organic particulates, including allergens. Activated carbon may be included in one or more layers. The frame is comprised of rubber, polypropene, or any other suitable material. The frame is adapted to engage with a filter housing in the vehicle.

It will then be appreciated that in a given environment, a particulate count, type, or noxious gas volume can vary greatly depending on various environmental locations or other factors. In the instance of air filtration, for example, particulate or contaminant density can vary greatly between environments encountered while driving, for example rural, urban, open air, tunnels, etc. By way of example, filters exist which are capable of removing noxious gasses or fumes which might be encountered in high concentration in a tunnel or high-density traffic, but not in an open-air highway or residential neighborhood. Similarly, certain gasses or fumes in the immediate proximity of a dairy farm might not be encountered while driving on a dirt road through a mountain pass wherein changing environmental needs will also result in wide variety of air filtration requirements.

Accordingly, the smart multi-modal vehicular air filtration management system 10 as contemplated herein can thus include various filter elements 300, 400, or 500. In the present embodiment, a plurality of housings 100 and 200 can be provided to house one or more of the various filter element types. It will then be appreciated that air conduits can be provided which connect the various housings and direct a flow of air from an intake 40, conduits between the various housings 154 to an outlet 250, which ultimately feeds into the cabin 4.

As illustrated the exterior filter housing 100 is provided with an intake 40 about an exterior filter housing inlet 110. In some embodiments, the inner surfaces of the intake 40 or the exterior filter housing 100 may be coated with an adsorption coating or adsorption media fixed thereon to adsorb harmful gases such as nitrogen oxides, hydrocarbons and sulfur dioxide; such that these surfaces are advantageously used to capture pollution before they enter the cabin 4. The adsorption media may include activated carbon, zeolites or other suitable adsorbents. The intake 40 can optionally include a moisture control system 50 configured to remove water droplets, snow, humidity, etc. Air received through the inlet 110 is passed through a first filter element 400 which may be located below a second filter element 300. In the embodiment shown the first filter element 400 is separated from the second filter element 300 by a predetermined distance or gap 170.

In some embodiments, a first or gap diverter 152 can be provided about an exterior filter housing outlet 150 of the exterior filter housing 100. The gap diverter 152 can be configured so as to selectively allow air to exit through the exterior filter housing outlet immediately upon passing through the first filter element 400 without passing through the second filter element 300 or alternatively allow air to pass through both filter element 400 and 300. It will be appreciated that the gap diverter 152 can be rotationally positioned about the exterior housing outlet 150 and can rotate so as to open a pathway into the conduit 154 from the gap 170 between the first filter element 400 and the second filter element 300, or from a gap or space 190 above the second filter element 300 while substantially blocking fluid communication between the gap 170 and the conduit 154. In this manner, the system can selectively provide only a single filtration pass of exterior air through the first filter element 400, or optionally a double pass filtration of exterior air through both the first filter element 400 and second filter element 300, with the understanding that more required filter element passes will correspond to a larger load on the fan and a corresponding increase in power consumption.

Once the air exits the exterior filter housing 100 it can then pass into the conduit and into a filtered inlet 210 of a cabin filter housing 200. The cabin filter housing 200 can also be provided with a cabin filter element 500 having various properties including adsorbent properties, fibrous filtration, activated carbon, or any other filter media type as will be appreciated by those having skill in the art.

In another embodiment, the first filter element 400, the second filter element 300, and the cabin filter element 500 are located in a single filter housing with diverters changing the flow path to allow air to flow through any combination of 1 or more filters.

In another embodiment, all three filter elements are located in separate filter housings with diverters changing the flow path of conduits to allow air to flow through any combination of 1 or more filters.

The cabin filter housing 200 can include three separate and distinct inlets, each having a corresponding diverter or closure mechanism. Illustrated in the present embodiment, the cabin filter housing includes the filtered inlet 210 as discussed above which receives air from the exterior filter housing 100 through conduit 154 with an optional filtered diverter 212 configured to selectively open or close the filtered inlet 210. Additionally, the cabin filter housing 200 can include a bypass inlet 230 which is open to unfiltered ambient air with a bypass diverter 232 being configured to selectively open or close the bypass inlet 230 based on a particular mode. Finally, the cabin air filter housing can have a cabin inlet 220 configured to receive air directly from the cabin 4 intended for recirculation and delivery back to the cabin, with a corresponding recirculation or cabin diverter 222 configured to selectively open or close the cabin inlet 220 based on a particular mode. The diverter 222 may comprise one or more parts or elements that function to selectively open or close the cabin inlet.

The smart multi-modal vehicular air filtration management system 10 can also include a user input interface 640 operatively connected to or integrated with a control unit 600 for receiving input from a user regarding individual preferences, or custom mode overrides or selections as well as adjusting into various modes based on sensed cabin and environmental conditions. In some instances, the user input interface can be provided within a dash control unit, and incorporated with other vehicular functions or displays.

It will then be appreciated that the control unit 600 can change the smart multi-modal vehicular air filtration management system 10 into and from various modes so as to optimize power consumption as well as maintain a desired user preference or cabin condition. These various modes will be discussed in more detail below in conjunction with the individual modes illustrated in the figures.

Additionally, the smart multi-modal vehicular air filtration management system 10 and associated control unit 600 can also include a location determination mechanism 650, such as a GPS unit utilizing location information. It will be appreciated that many vehicles today utilize GPS on a continual basis, and as such, instead of utilizing real-time sensor data, the GPS can instead determine a location, which is already being performed, and adjust modes or characteristics of the smart multi-modal vehicular air filtration management system 10 based on an external database 700 containing historical or alternative real time environmental data corresponding to the determined location. An example of such could be from a global weather network which already tracks environmental factors such as particulate density or concentration, temperature, humidity, etc. In this instance power to operate and real-time sensors can be eliminated and instead replaced with a data connection to provide applicable sensor data. Such a system could also determine, based on location and speed, that a particular vehicle is stuck in a traffic jam, or driving on an open highway, and thus adjust the smart multi-modal vehicular air filtration management system 10 characteristics accordingly.

The database 700*a* could be remotely accessed via cellular, Wi-Fi or other radio signals or it could be contained within an onboard database 700*b* provided on or in the vehicle and updated periodically, such as when an electric car is plugged in and charging. The control unit 600 can determine the charging state and access remote database 700*a* to sync with the onboard database 700*b*. It should also be noted that sensed data coupled with GPS location information can be stored onto database 700*b* and alternatively uploaded to remote database 700*a*.

Figure 2:
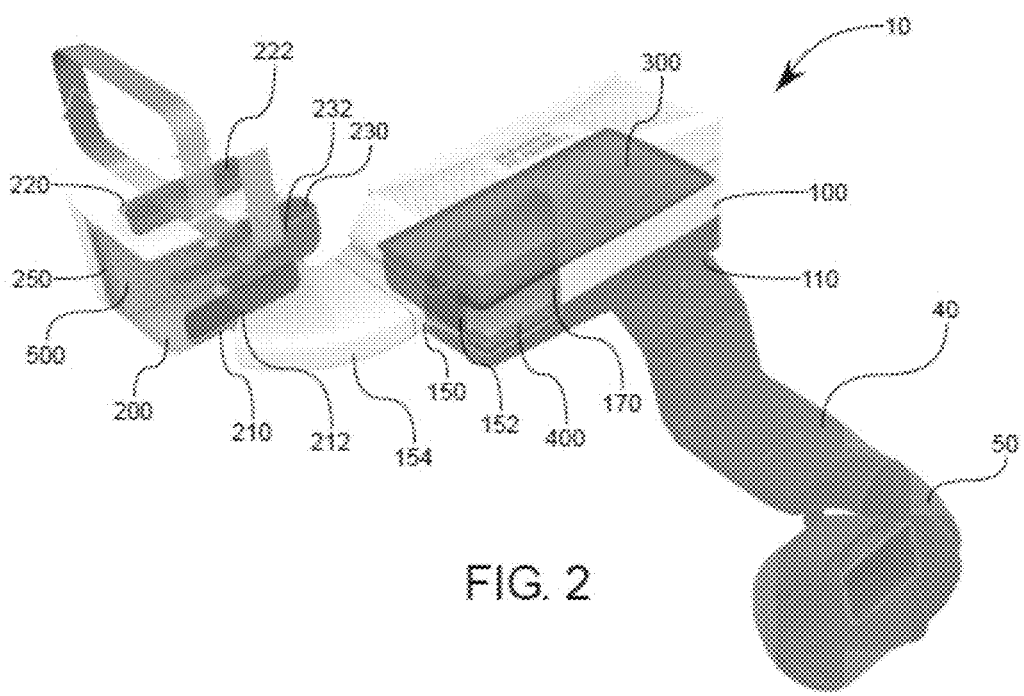
FIG. 2 illustrates a perspective view of the smart multi-modal vehicular air filtering system of FIG. 1 being illustrative of various aspects of the present invention in a first configuration.

FIG. 2 illustrates a first mode in which the smart multi-modal vehicular air filtration management system 10 can be operated in which the filter bypass inlet 230 is open so as to allow for intake of unfiltered air to reduce or avoid an increase of CO2 concentration in the cabin, or may be selected by a user via user input interface 640. The unfiltered air is combined with air received from the cabin through the cabin air inlet 220 for recirculation into the cabin. This mode is typically utilized in conditions where the exterior ambient air is substantially free of particles or other contaminants. In this embodiment, the total energy consumption and load on the fan is reduced to a minimum level as the only filtration occurring is through a single filter element, i.e. the cabin filter element 500, and as there is only a singular filtration pass, which will cause the least flow resistance.

It will be appreciated that a similar mode is contemplated herein where both the bypass inlet 230 and the filtered air inlet 210 are closed and only cabin air is received by the cabin filter housing 200 through the cabin air inlet 220 and recirculated back into the cabin after a pass through the cabin filter element 500. This mode may be selected by a user via the user input interface 640 or by controller 600 when ambient air quality is very poor or polluted.

Figure 3:
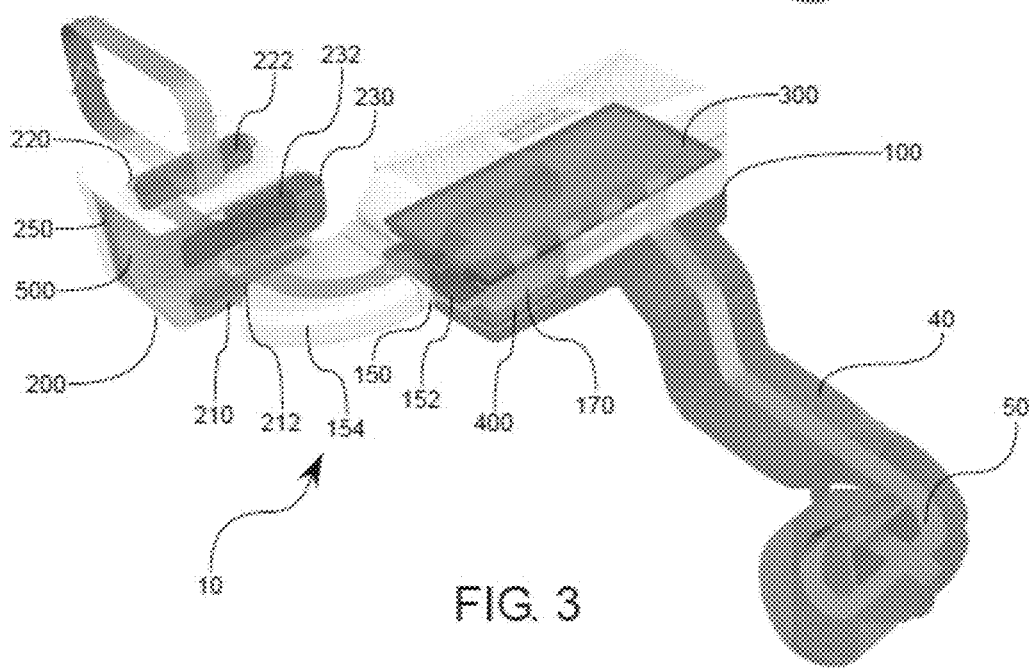
FIG. 3 illustrates a perspective view of the smart multi-modal vehicular air filtering system of FIG. 1 being illustrative of various aspects of the present invention in a second configuration.

FIG. 3 illustrates yet another mode in which the smart multi-modal vehicular air filtration management system 10 can be operated. In this mode, the bypass inlet 230 is closed by bypass diverter 232 and diverters 212 and 222 are both opened so as to draw air into the cabin filter housing through the filtered air inlet 210 from the exterior filter housing 100 from the intake 40, and ultimately from the ambient environment, as well as recirculated air in the vehicle cabin 4. In this embodiment the ambient air is drawn through the first filter element 400, but the diverter 152 allows for air to pass from the gap 170 directly into the conduit 154 and into the filtered air inlet 210 without passing through the second filter element 300, but still passing through the cabin filter element 500 such that the system requires two filter element passes, with a corresponding increase in load on the fan 652.

This mode is applicable in driving or ambient conditions which include a moderate amount of contaminants in the ambient air. In particular situations, where the sensor detects that the particle concentration is shifted towards course particles, e.g. PM 10.

Figure 4:
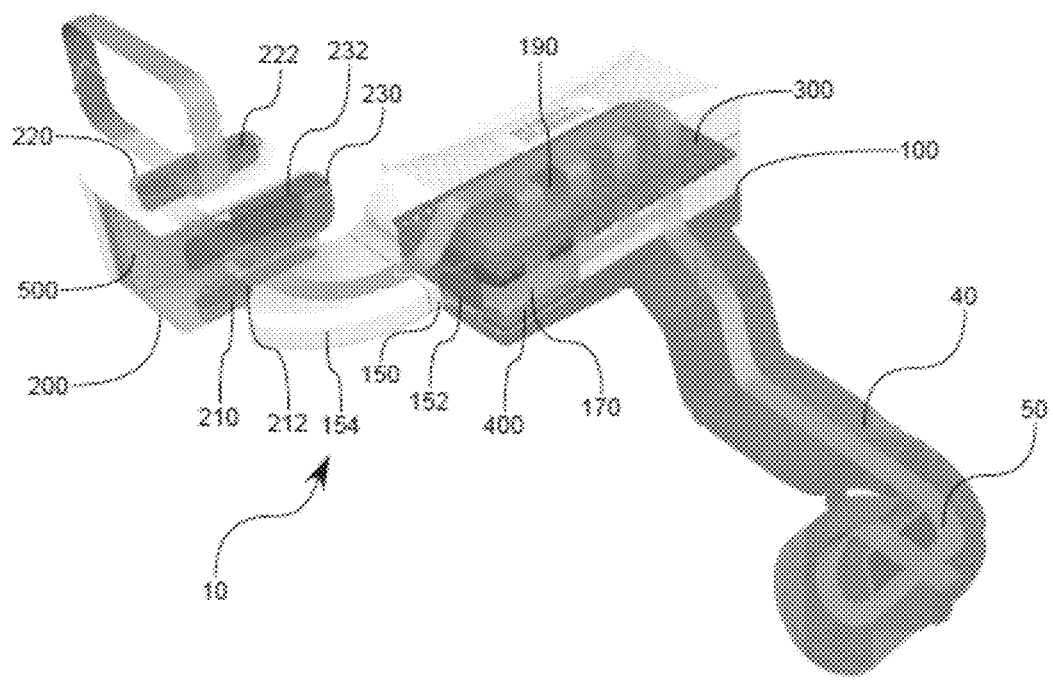
FIG. 4 illustrates a perspective view of the smart multi-modal vehicular air filtering system of FIG. 1 being illustrative of various aspects of the present invention in a third configuration.

FIG. 4 illustrates yet another mode in which the smart multi-modal vehicular air filtration management system 10 can be operated. In this mode the bypass inlet 230 is still closed by diverter 232 and diverter 212 is opened so as to draw air into the cabin filter housing through the filtered air inlet 210 from the exterior filter housing 100, from the intake 40, and ultimately from the ambient environment. The difference of this mode from that shown in FIG. 3 is that diverter 152 is oriented so as to block the gap 170 from fluidly communicating with the conduit 154 directly. Instead the air is drawn through both the first filter element 400 and the second filter element 500 into a ceiling portion or space 190 of the filter housing prior to being allowed to flow into the conduit 154. As such, this mode requires a triple filter element pass and corresponding load increase on the fan but providing a maximum filtration of the air drawn into the cabin. It will then be appreciated that the second filter element 300 can be a fine particulate filter, such as a HEPA filter, wherein the first filter element can be provided as a fibrous filter media which entraps large particles thus protecting the cabin air from large particles when the second filter element 300 is not being used. The HEPA filter requires a very tight seal in the filter housing, to ensure that fine particles are trapped in the filter media and do not enter the air outlet via a poor seal. This may be accomplished using radially or axially sealing between the filter element frame and the housing.

This mode is applicable in driving or ambient conditions which include a heavy amount of contaminants in the ambient air. In particular situations with large particulates in combination with fine particulates, for example where the sensor detects or indicates that particle concentration is shifted towards fine particles, e.g. PM2.5 or PM1.

It will be appreciated that in any of the instances wherein a particular diverter is opened or closed, that the diverters can instead be incrementally adjusted so as to allow a larger or smaller degree of air to pass around them through the corresponding filter element. In particular, the amount of cabin air being recirculated at any given time can have a wide variety of proportional ranges from fully open, partially open in varying degrees, or completely closed, in any of the modes, depending on cabin air conditions.

It will be further appreciated that in various instances that the filter media can be refreshed by reversing periodically reversing fan direction.

In some instances, such as for electric cars, which require battery recharging on a regular basis, that the controller 600 can receive location data and determine when the battery is receiving a charge, and based on various conditions, such as when at home, at a certain time, when the vehicle is otherwise off, that the fan direction can be reversed, and varying diverters opened so as to blow particulates backwards and out of the filter element so as to refresh the media of the filter element for the next drive.

In another instances, the fan direction is reversed and varying diverters opened to use air for the desorption or release of molecules that are bonded to surface of the absorbents.

It will also be appreciated by those having skill in the art and having possession of this disclosure that various filter element types can be utilized in various positions within the disclosed system. Some such filter element types can include filter media having adsorbent materials which can absorb a certain degree of moisture or noxious gasses. It is also common for motors to generate large amounts of heat, and batteries and electric motors to generate heat while in use, or for batteries while charging. In some instances heat from these processes can be directed into close proximity to the adsorbent filter media during a refreshing mode with the fan blowing in reverse direction so as to refresh the adsorbent properties of the filter media. Additionally, some adsorbent materials, such as activated carbon, which require driving forces like concentration difference between fluid and adsorbent, or energy in the form of temperature or under pressure in order to remove molecules from surface absorbents.

It will then be understood that a reverse fan mode which is intended to refresh the cabin filter element 500 can be coupled with an opening of the bypass inlet so as to allow air with entrained molecules or particulates to exit directly to the ambient air.

After the cabin filter element 500 has been refreshed the bypass inlet 230 can be closed and air pushed in a reverse direction through the first filter element 400 and the second filter element 300, with the diverter 152 in an appropriate open or closed position so as to refresh the first filter element 400 and the second filter element 300, either together, or the first filter element 400 alone.

These aspects of the invention are not meant to be exclusive and other features, aspects, and advantages of the present invention will be readily apparent to those of ordinary skill in the art when read in conjunction with the following description, appended claims, and accompanying drawings. Further, it will be appreciated that any of the various features, structures, steps, or other aspects discussed herein are for purposes of illustration only, any of which can be applied in any combination with any such features as discussed in alternative embodiments, as appropriate.

Figure 5:
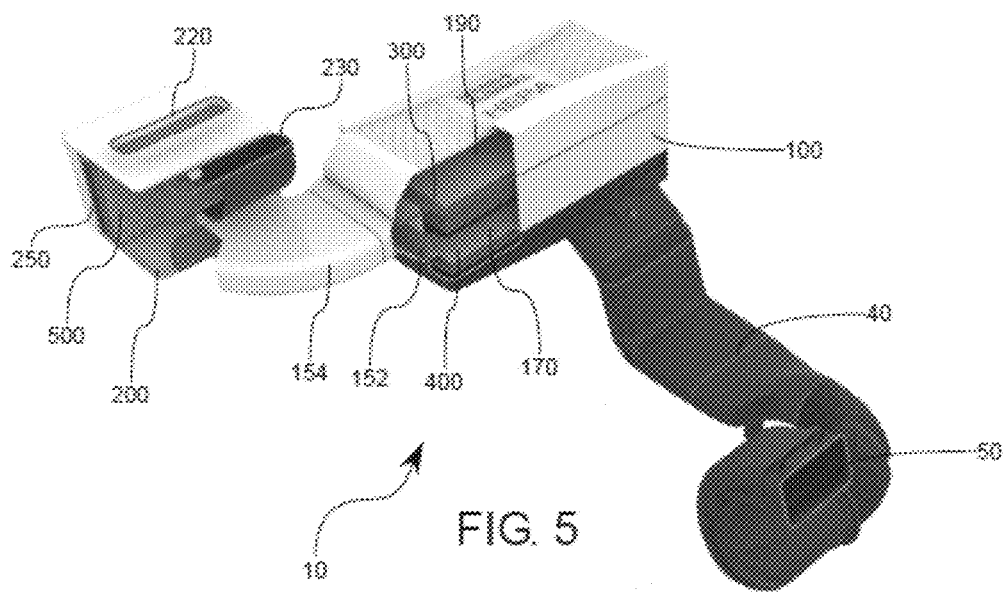
FIG. 5 illustrates a perspective partial cut-away view of the smart multi-modal vehicular air filtering system of FIG. 1 being illustrative of various aspects of the present invention in the first, second or third configuration.
Figure 6:
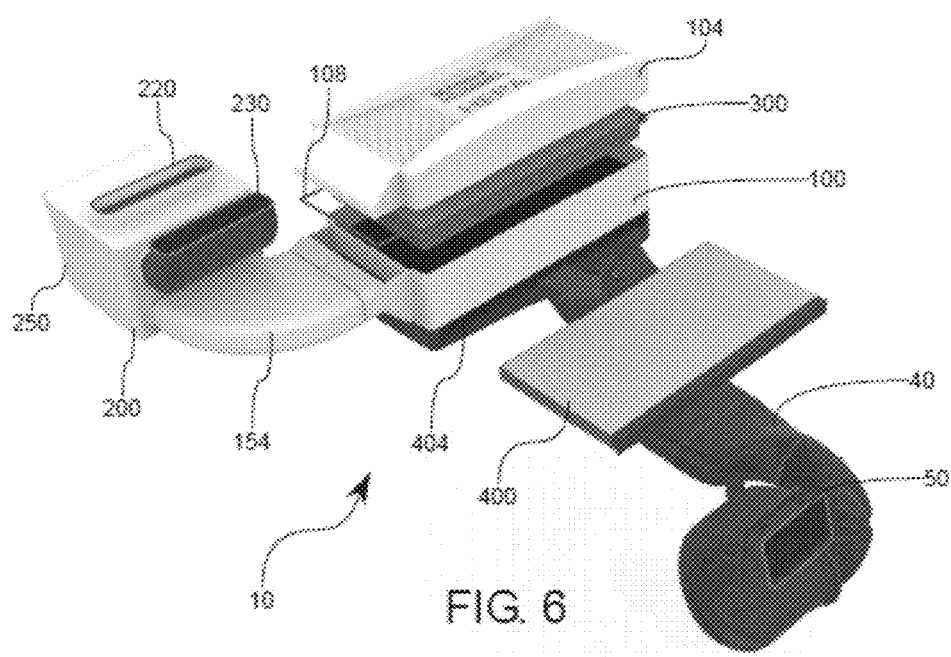
FIG. 6 illustrates a perspective exploded view of the smart multi-modal vehicular air filtering system of FIG. 1 being illustrative of various aspects of the present invention.

FIGS. 5-6 illustrate the smart multi-modal vehicular air filtration management system 10 in partial cutaway and exploded vies so as to better illustrate positioning and various additional aspects of the present invention.

FIG. 6 illustrates a slot 404 of filter housing 100 that allows for an independent removal and replacement of filter element 400. Similarly, filter element 300 can be independently replaced by removing a housing lid 104. A gasket or liner 108 helps to seal the lid 104 to the filter housing 100, so as to ensure no or minimal leakage occurs.

Figure 7:
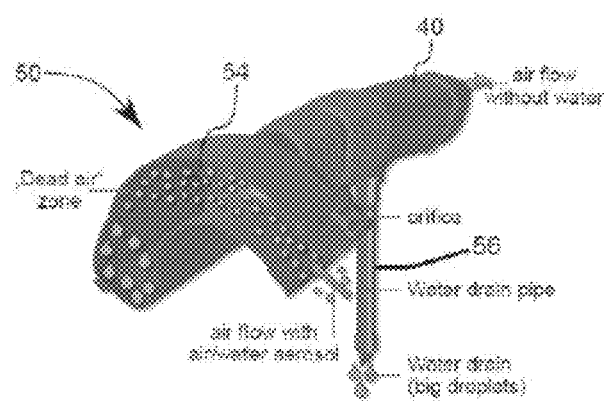
FIG. 7 illustrates a perspective cross-sectional view of a moisture control system which can be optionally provided along an intake of the smart multi-modal vehicular air filtering system of FIG. 1.

FIG. 7 illustrates a cross-sectional perspective view of a moisture control unit 50 which can be provided about the intake 40. The moisture control unit 50 can be provided with a hydrophobic interior wall 54 and include a vortex design having a dead air zone configured to cause entrained droplets to collect and ultimately drain to the bottom of the moisture control unit and then drained from the air intake from a water drain pipe 56.

Figure 8:
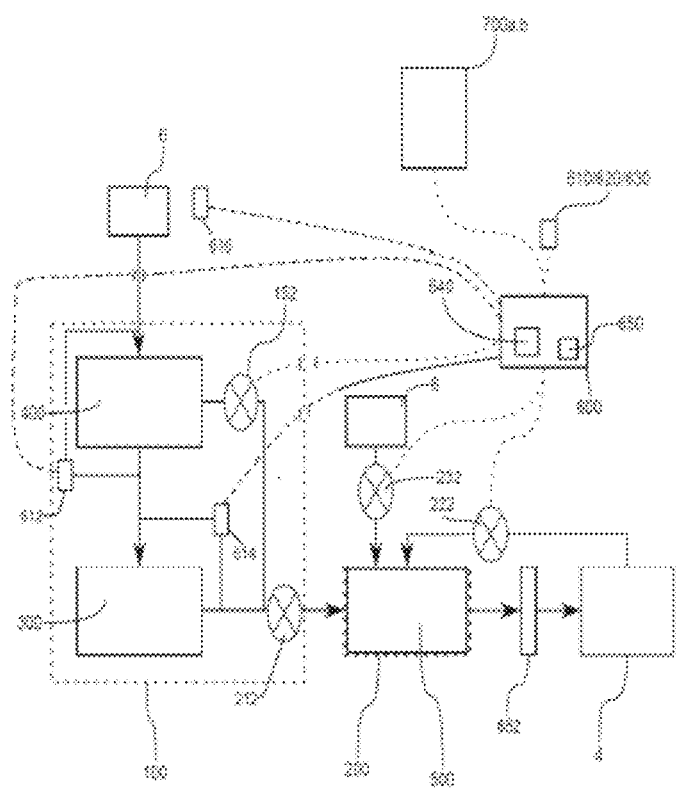
FIG. 8 illustrates a schematic view of the smart multi-modal vehicular air filtering system of FIG. 1 being illustrative of various aspects of the present invention.

FIG. 8 illustrates a conceptual schematic of the smart multi-modal vehicular air filtration management system 10 as discussed above which illustrates in more detail various systems to which the control unit can be connected. For example, the control unit 600 can be connected to the various sensors, which can include turbidity sensors (ex: real-time particle size/particle concentration sensors which preferably have a real-time sampling rate and preferably provide particle concentration values according to standard particulate matter (PM) levels, these sensors include outdoor air sensor 616 and may include real-time cabin sensor 620. As an example, a human hair is nominally 50-70 microns in diameter. Fine particles (PM2.5) can typically only be seen with an electron microscope. Fine particles are produced from all types of combustion, including motor vehicles, power plants, residential wood burning, forest fires, agricultural burning, and some industrial processes. Particles less than or equal to 10 micrometers in diameter (PM10) are so small that they can lodge into small cavities in the lungs, potentially causing serious health problems. HEPA filters are used to reduce PM2.5 particles in the air.

The outdoor air sensor 616 and/or the real-time cabin sensor 620 preferably detect particulate loads in the ambient air and preferably include gas composition sensors configured to determine contaminants or alternative noxious gasses, for example, any or all of: ammonia (NH3), volatile organic compounds (VOCs), sulfur dioxide SO2), nitrogen oxides (NOX) and aromatic hydrocarbon. The interior cabin has aa real-time cabin sensor 620 which can be configured as an air quality sensor and preferably detects also carbon dioxide (CO2) levels, humidity, particulate counts (as discussed above). In some instances the control unit 600 can be connected to alternative sensors 630 which can be configured to provide alternative parameters which might have an effect on air quality, for example, the alternative sensors can be pressure sensors or pressure sensitive switches operatively connected to the various seats within the vehicle, wherein additional passengers would require additional fresh air circulation and a reduced cabin re-circulation as a corresponding carbon dioxide increase will be realized with said additional passengers.

In one instance other pressure sensors or differential pressure sensors 612, 614 may be provided to detect pressure drop through the filter element 400 and 300 and enable calculation of remaining filter element life, and end of life/service interval alarms, particularly by detecting increasing pressure across the filter element. Preferably these are differential pressure (DP) sensors, detecting the press drop across the filter element from an inlet side to an outlet side of the filter element, although as an alternate in some embodiments, the pressure sensor may detect only the filter outlet side pressure relative to ambient pressure, providing the pressure drop relative to ambient pressure. The differential pressure sensors may be integrated into the housing 100 or provided on, integrated with the first filter element 400 and/or the second filter element 300. These sensors may be CAN Bus compatible to communicate with the control unit 600, or RFID sensors provided on the filter elements. Additionally a differential pressure (DP) sensor may advantageously be provided for the monitoring pressure drop across the cabin filter element 500 to monitor the remaining service life and to detect end of service, time for replacement. In addition to CAB Bus, other network technologies or communication means as discussed earlier may alternately be used. In the example of FIG. 8, differential pressure sensor 612 measures the pressure drop across the first filter element 400. Differential pressure sensor 614 measures the pressure drop across the second filter element 300. Differential pressure measurements are communicated to the control unit 600, which is preferably a computer control unit, configured with programmed control strategies controlling the smart multi-modal vehicle air filtering system, as discussed with FIG. 10.

Additionally the control unit 600 can receive location and make determinations based on an external database 700a having historical data, real-time data, or both in coupled to a particular location in order to determine ambient air conditions. In some embodiments the control unit 600 can also receive additional data including, time, speed, traffic information, etc. all being associated with the vehicle's particular location in order to determine a best mode without needing to power a plurality of various sensors and types.

In particular the various diverters are illustrated herein as electromechanical flaps which are actuated through axial rotation so as to cover various inlets or outlets. Various other embodiments are contemplated herein, including but not limited to planar displacement of the flaps through channels provided about opposing edges. Additionally, various pneumatic actuation is contemplated herein wherein positive or negative pressures are applied so as to push or pull the various diverters into particular positions based on a desired mode. It will be appreciated that the diverters can be provided as lamellae flaps as illustrated wherein the flaps can include rigid central portions with elastically deformable edge portions so as to increase seal liability.

Additionally the filter element can include substances and media designed not only to remove particulates of varying sizes but also to remove harmful gases and fumes including carbon monoxide, nitrous oxide, water, sulfuric oxides, volatile organic compounds such as methane or other hydrocarbons. The filter element, particularly the second filter element 300 and/or the cabin filter element 500 may include adsorbents of activated carbon or zeolites in the filter media, or have a layer of adsorbents provided on the filter media to remove non-harmful but offensive odors, such as those from landfills, wastewater treatment plants, manure, or other wastes can be absorbed by various filter media such that the gas levels cannot be detected by the human nose, as well as to preferably remove harmful gases including NOX, NH3, aromatic hydrocarbons, SO2, O3, and volatile organic compounds (VOCs).

It will be appreciated that the diverters discussed herein can be modified in a number of ways to perform the same function. For example, the diverters could be one-way valves, two-way valves, sliding valves, rotational valves, flaps, or any other type or configuration that allows air to be redirected or the flow of air to be controlled. The diverters may comprise multiple parts or elements. It should also be appreciated the diverters can be formed such that the control unit 600, or other microcontroller, can cause them to open, partially-open or close via a motor or other actuating device. In pneumatic versions, vacuum or pressure redirection can replace the actuators or motors directly causing the diverters to adjust. Advantageously, the various sensors discussed herein and the diverter actuators may be CAN Bus compatible, configured to communicate digitally with the control unit 600 and other devices over the vehicle Controller Area Network (CAN bus). Alternately various sensors discussed herein and the diverter actuators may communicate with the control unit 600 over another know type of vehicle network, WIFI, or by analog voltage or current loop signals as are known to those skilled in the art of vehicle control technologies.

In another embodiment a method of managing the filtration of a vehicle, comprising the steps of: detecting at least one parameter of ambient air from outside of a vehicle; detecting at least one parameter of cabin air from inside of the vehicle; modifying an air flow path through a filter management system using a plurality of diverters, wherein the filter management system comprises: a first filter element and a second filter element disposed in a fresh air housing, wherein the fresh air housing has an inlet, an outlet and a first diverter, a third filter element disposed in a cabin housing, wherein the cabin housing has a filtered inlet and filtered diverter, a fresh air inlet and bypass diverter, and a recirculation air inlet and cabin diverter, and a fluid channel arranged between the fresh air and cabin housing.

In the above method embodiment, the air flow path is directed in one of the following manners: ambient air flows into the fresh air housing through the first element and the second filter element and then into cabin housing through the third filter element; ambient air flows into the fresh air housing through the first filter element and then into cabin housing through the third filter element; ambient air flows into the cabin through the fresh air inlet and through the third filter element; or ambient air flows into the cabin housing from the recirculating air inlet and through the third filter element.

The method above can further comprise a step of detecting a number of occupants inside a vehicle and modifying the speed of the air flow path based on the number of detected occupants. The number of occupants may be detected by, for example, seat belt status switches (belt fastened), or by seat occupancy sensors, (such as pressure sensitive switches installed in or under the seat cushion to detect when an occupant is seated), or by other detection means as would be known to those skilled in the art.

The method above can alternatively comprise a step of modifying the air flow path based on recording the sensed data along with location information received from a GPS unit into a database.

The method above can further comprise a step of determining a charging status of a vehicle and based on that status revert the air flow path to be directed from a clean side of the third filter element through the third filter element and out through the fresh air inlet.

Another method embodiment of managing the filtration of a vehicle, comprises the steps of: determining a location of the vehicle; accessing a database having air quality information associated with the determined location; and modifying an air flow path through a filter management system using a plurality of diverters, wherein the filter management system comprises: a first filter element and a second filter element disposed in a fresh air housing, wherein the fresh air housing has an inlet, an outlet and a first diverter, a third filter element disposed in a cabin housing, wherein the cabin housing has a filtered inlet and filtered diverter, a fresh air inlet and bypass diverter, and a recirculation air inlet and cabin diverter, and a fluid channel arranged between the fresh air and cabin housing.

The method embodiment directly above can cause the air flow path to be directed in one of the following manners: air flows into the fresh air housing through the first filter element and the second filter element and then into cabin housing through the third filter element; air flows into the fresh air housing through the first filter element and then into cabin housing through the third filter element; air flows into the cabin through the fresh air inlet and through the third filter element; or air flows into the cabin housing from the recirculating air inlet and through the third filter element.

The embodiment method above using location information can further comprise the step of detecting a number of occupants inside a vehicle and modifying the speed of the air flow path based on the detected number occupants.

The embodiment method above using location information can further comprise the step of determining a charging status of a vehicle and based on that charging status revert the air flow path to be directed from clean side of the third filter element through the third filter element and out through the fresh air inlet.

Figure 9:
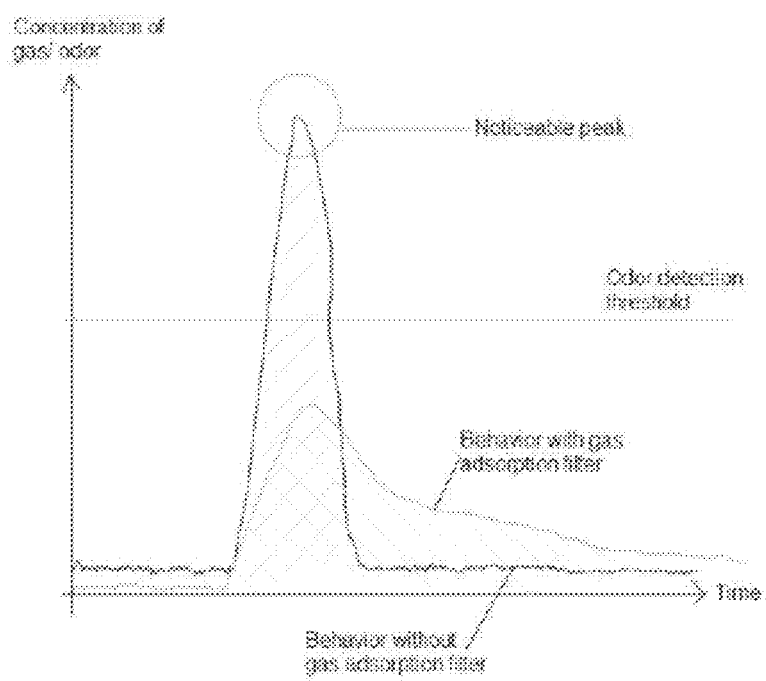
FIG. 9 provides a chart illustrating the odor reducing effect of the adsorbent coating or media in the intake and/or exterior filter housing or in the adsorbent as may be provided with or on the cabin filter media.

FIG. 9 provides a chart illustrating the odor reducing effect of the adsorbent coating or adsorbent media as may be provided in the intake 40 and/or exterior filter housing 100 and may be provided with or on the media of cabin filter element 500.

During adsorption, gaseous or released substances are concentrated on the boundary layer (or surface) of a particulate adsorption media. Molecules are linked to the surface of and fixed. The adsorption processes is reversible. The term 'physisorption' may be used as this is a physical process. The release of adsorbed molecules from the surface is desorption. The basic adsorption process is based on a surface effect. The pollutants are trapped on a surface and are concentrated there. They do this on any surface, in principle. Preferably the adsorbent material is activated carbon or zeolites. Activated carbon is particularly advantageous as (for example) 1 teaspoon of activated carbon may have the same inner surface area as a football field, and can bind to a large amount of unwanted odorous or harmful gases, removing them from the cabin air stream. As shown in FIG. 10, the adsorption behavior is advantageous to reduce or eliminate intermittent 'peak' occurrences of odorous gases by adsorbing these gases and then later slowly releasing the gases, reducing the 'noticeable peak' concentration of odorous gases below the 'odor detection threshold'.

Regarding FIG. 10, for a better understanding of the invention, the table of FIG. 10 provides as a table an envisioned functional description of a computer controlled operation of a smart multi-modal vehicular air filtering system according to FIG. 8. It is envisioned that the control program logic of the control unit 600 may reside in the vehicle management computer. Alternately, the program control logic of the control until 600 maybe be realized in a separate computer realizing the disclosed control unit 600. The values and conditions cited below are provided only to provide a working enabling example of a functional operation of disclosed embodiments of the smart multi-modal vehicular air filtering system. The invention is not limited to the specific values and conditions provided below. In FIG. 10, the presence of an "x" in the bale indicates "in use", "switched on" or "streamed through" with air. The absence of a "x" indicates not in use, "switched off" or "bypassed" by a diverter for example, or (for a filter) rotated in the housing to a bypass position. Although diverters for filter element bypass are shown, in other embodiments the filter elements may be configured to rotate in the housing from a first position in which the filter element is positioned to require the air flow to flow through the filter element, to a second position where the filter element is rotated in the housing to a second position substantially aligned with the air flow such that the air flow can bypass the filter element, this under the control of the control unit 600. For better understanding of the controlled operation of the system, 6 driving situations are discussed below.

Driving Situation 1: Fresh, Good Outside Air (Yosemite Mode).

Initial Situation: (for Example) 15 Degrees C. Outside Temperature, 60% Air Humidity, Pollen Concentration Moderate, No Fumes, Little Fine Dust).

The driver starts in suburban area his way to a workplace in good, fresh air. The vehicle recognizes the presence of the driver, thereby the vehicle automatically heats itself to 21 degrees, easy dehumidification, volume flow 200 m3/h. The outside- and inside air quality sensor shows that the outer respectively the inner air is good and so the outer air filtration step is not needed (filter elements: first filter element 400 and second filter element 300). Both elements were taken out of the airflow. This contains two advantages 'less energy consumption of the whole system because of the lower pressure drop and also a higher lifetime of both filter elements, because they will not be flowed through directly. Due to the lower exposure, a lower filtration performance for the outer air is needed, so it's sufficient to filter the inside air as well as a small part of the outside air with the circulating filter. The bypass diverter 232 and/or the cabin diverter 222 operate to regulate the proportion of circulating air 95% to fresh air 5%. Moreover the stagnation pressure, which is built in the intake system of a driving car, can be used for desorption of the harmful car adsorbent in the intake 40 or exterior filter housing 100 as well as the gas adsorbing material of the filter element 500 to remove harmful gases, i.e. activated carbon or zeolites. If necessary an additional blower can support to deliver need desorption air flow.

Driving Situation 2:

Situation Change 1 to 2—Moderate/Average Exposure to Particles and Harmful Gases.

Two persons get into the car, so heating will be reduced because of two more persons. Volume flow rises to 300 m3/h, the outside air proportion also rises to react to higher CO2 and humidity. The cabin sensor 620 in the passenger compartment will detect the rising CO2 exposure and the fresh air supply will be increased by the cabin diverter 222 (example: 85% circulating air/15% fresh air). After some ongoing driving to work, the driver needs to go on the motorway. Now in rush hour or heavier traffic, the exposure of the air to harmful gases and particles rises. Because of the higher supply of fresh air and the higher outside air exposure (outer air sensor 616), the first filter element 400 will be switched on (filtered diverter 212 opens, gap diverter 152 opens). The second filter element 300 (a fine dust filter) will not be needed in this situation and so is bypassed through gap diverter 152). The cabin filter element 500, depending on situation, may be active or inactive (in embodiments with a bypass around cabin filter element 500), according to the cabin sensor 620 is reporting about the air quality in the passenger compartment.

Driving Situation 3:

Situation change 2 to 3—Traffic Jam while Rush Hour.

Due to the increasing traffic, the traffic flow is slow or stop and go. The fine dust exposure in the outside air increases because of the increasing traffic (outside air sensor 616). The system switches on to 100% circulating air mode (cabin diverter 222 open). In this situation, the cabin filter element 500 will be streamed through by the recirculating air. Preferably the media of the cabin filter element includes an absorbent (activated carbon or zeolites) to adsorb harmful gases. Preferably the cabin filter media includes a biofunction media to reduce or kill airborne bacteria viruses and remove allergens. If the bad traffic situation does not improve, the CO2 concentration in the inner space will continue to rise. Additional fresh air should be supplied. Because the outside air sensor 616 indicates the high fine dust exposure in the outside air, the outside air is streamed through both the first filter element 400 and the second filter element 300 (gap diverter 152 closed), the addition of the second filter element (preferably a HEPA filter) to filter smallest particles, too. Due to the lack of stagnation pressure in the intake system, the blower of the system needs more energy to draw in outside air, so air from outside will just be supplied until the CO2 concentration declines (cabin sensor 620, outside air sensor 612). If the concentration of CO2 declines sufficiently, the system switches on to a high recirculated air proportion (bypass diverter 232 and/or the cabin diverter 222) to reduce the pressure drop and the resulting blower power, because just the cabin filter element 500 is streamed through to reduce particulates and harmful gasses in the cabin.

Driving Situation 4:

Situation Change 3 to 4—from Traffic Jam to Tunnel Crossing (Vehicle May Determine a Tunnel by GPS Position, Sun Sensor or Other Means.).

The vehicle recognizes the entrance of the tunnel, for example, a GPS 650, a user input via the user input interface, or sun sensor. Because of the short, high exposures in the tunnel, the system switches to 100% circulating air (bypass diverter 232 and/or the cabin diverter 222). The contaminated outside is not needed, not filtered so the outside air filtration step is not stressed unnecessarily. Cabin filter element 500 will be streamed through actively. The cabin sensor 620 measures the CO2 concentration in the passenger cabin during the tunnel crossing, allowing the system to react to possibly supply fresh air. After the vehicle leaves the tunnel, the system will be flooded by fresh air. Depending on the outer air quality, the first filter element 400 and possibly the second filter element 300 will be switched on (opening/closing of gap diverter 152).

Driving Situation 5:

Situation 4 to 5—Durable, High Exposures in Traffic.

System will be flooded by fresh air, the first filter element 400 and the second filter element 300 are active (gap diverter 152 closed, bypass diverter 232 open) to provide 100% fresh air over a short term. Cabin sensor 620 checks the inner space air of the cabin, if it is okay, the system switches to recirculate a portion of the cabin air. The proportion of circulating air to fresh air is in constantly regulation between 0% and 100% (modulating position of cabin diverter 222).

Driving Situation 6:

Special Case Desorption: Driving Situation Parking or at Charging Station.

Outdoor air sensor 616 reports low stressed outer air. Bypass diverter 232 opens. The adsorbent material in the intake 40 or housing(s) 100, 200 may be regenerated to desorb adsorbed harmful gases (regeneration of adsorbent). Waste heat from the battery charging process can be used to improve the desorption performance.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. For example, aspects of the present invention can be similarly applied to other filtration systems in various environments, including HVAC and other equipment filtration or fluid filtration systems.

Modifications and substitutions by one of ordinary skill in the art are considered to be within the scope of the present invention. Additionally, any features, structures, components, method steps which are discussed in reference to any one of the aforementioned embodiments are readily adaptable for use into and with any features of the other alternative embodiments discussed therein, with the understanding that one of ordinary skill in the art will be capable of assessing the ability of the various embodiments disclosed and be capable of making such adaptations.

The invention claimed is:

1. A method of managing filtration of a vehicle, the method comprising:
   detecting at least one parameter of ambient air from outside of the vehicle comprising a filter management system, the filter management system comprising:
      a first filter element and a second filter element disposed in an exterior fresh air housing, wherein the exterior fresh air housing comprises an inlet and an outlet;
      a third filter element disposed in a cabin housing, wherein the cabin housing comprises at least one inlet, and the at least one inlet is a filtered inlet;
      a fluid channel arranged between the exterior fresh air housing and cabin housing, wherein the filtered inlet of the cabin housing is configured to receive air from the exterior fresh air housing through the fluid channel; and
      a first diverter disposed near the outlet of the exterior fresh air housing;
   detecting at least one parameter of cabin air from inside of the vehicle;
   based on the detected at least one parameter of ambient air and/or the detected at least parameter of cabin air being course particles, controlling the first diverter to move to a first position that opens a first pathway from a gap between the first filter element and the second filter element, through the outlet and into the fluid channel, so that only ambient air that passed through the first filter element into the gap without passing through the second filter element is allowed to exit the outlet into the fluid channel; and
   based on the detected at least one parameter of ambient air and/or the detected at least parameter of cabin air being fine particles, controlling the first diverter to move to a second position that opens a second pathway from a space adjacent to the second filter element, through the outlet and into the fluid channel, while substantially blocking the first pathway between the gap and the fluid channel, so that only ambient air that passed through the first filter element and the second filter element into the space is allowed to exit the outlet into the fluid channel.

2. The method of claim 1, further comprising:
   detecting a number of occupants inside the vehicle; and
   modifying a speed of an air flow path through the filter management system, based on the detected number of occupants.

3. The method of claim 1, wherein the first diverter is controlled to move further based on location information that is received from a global positioning system unit.

4. The method of claim 1, further comprising:
   determining a charging status of the vehicle; and
   based on the determined charging status of the vehicle, controlling a recirculation diverter to open so that the cabin air is received from a clean side of the third filter element through the third filter element and out through a fresh air inlet.

5. A non-transitory computer-readable storage medium storing code comprising instructions configured to, when executed by at least one processor, cause the at least one processor to:
   detect at least one parameter of ambient air from outside of a vehicle comprising a filter management system, the filter management system comprising:

a first filter element and a second filter element disposed in an exterior fresh air housing, wherein the exterior fresh air housing comprises an inlet and an outlet;

a third filter element disposed in a cabin housing, wherein the cabin housing comprises at least one inlet, and the at least one inlet is a filtered inlet;

a fluid channel arranged between the exterior fresh air housing and cabin housing, wherein the filtered inlet of the cabin housing is configured to receive air from the exterior fresh air housing through the fluid channel; and a first diverter disposed near the outlet of the exterior fresh air housing;

detect at least one parameter of cabin air from inside of the vehicle;

based on the detected at least one parameter of ambient air and/or the detected at least parameter of cabin air being course particles, control the first diverter to move to a first position that opens a first pathway from a gap between the first filter element and the second filter element, through the outlet and into the fluid channel, so that only ambient air that passed through the first filter element into the gap without passing through the second filter element is allowed to exit the outlet into the fluid channel; and based on the detected at least one parameter of ambient air and/or the detected at least parameter of cabin air being fine particles, control the first diverter to move to a second position that opens a second pathway from a space adjacent to the second filter element, through the outlet and into the fluid channel, while substantially blocking the first pathway between the gap and the fluid channel, so that only ambient air that passed through the first filter element and the second filter element into the space is allowed to exit the outlet into the fluid channel.

6. The non-transitory computer-readable storage medium storing code of claim 5, wherein the instructions are further configured to, when executed by the at least one processor, cause the at least one processor to:

detect a number of occupants inside the vehicle; and modify a speed of an air flow path through the filter management system, based on the detected number of occupants.

7. The non-transitory computer-readable storage medium storing code of claim 5, wherein the first diverter is controlled to move further based on location information that is received from a global positioning system unit.

8. The non-transitory computer-readable storage medium storing code of claim 5, wherein the instructions are further configured to, when executed by the at least one processor, cause the at least one processor to:

determine a charging status of the vehicle; and based on the determined charging status of the vehicle, control a recirculation diverter to open so that the cabin air is received from a clean side of the third filter element through the third filter element and out through a fresh air inlet.

* * * * *